July 21, 1964 U. C. McMILLER 3,141,588
CAR-TOP LUGGAGE CARRIER WITH CLAMPING, SUPPORT BRACKETS
Filed May 29, 1962
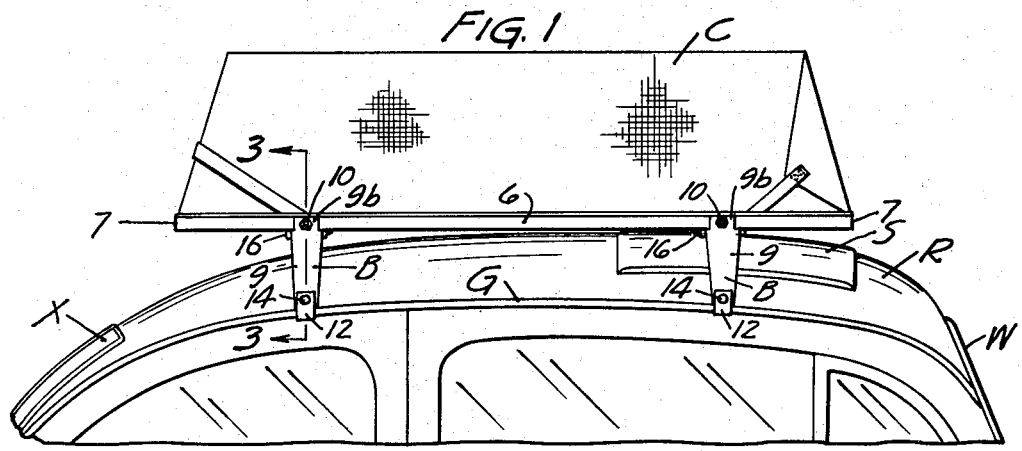
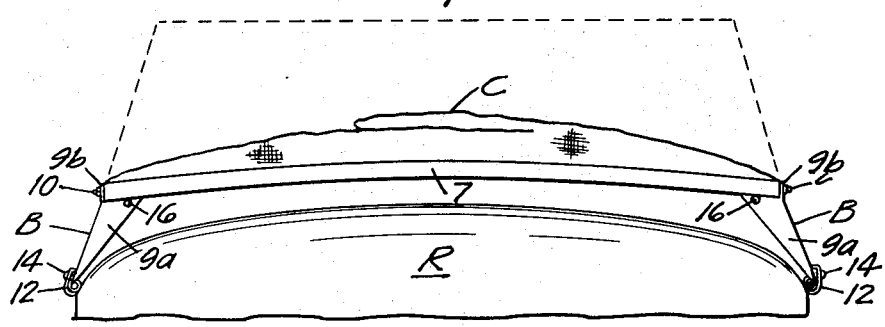
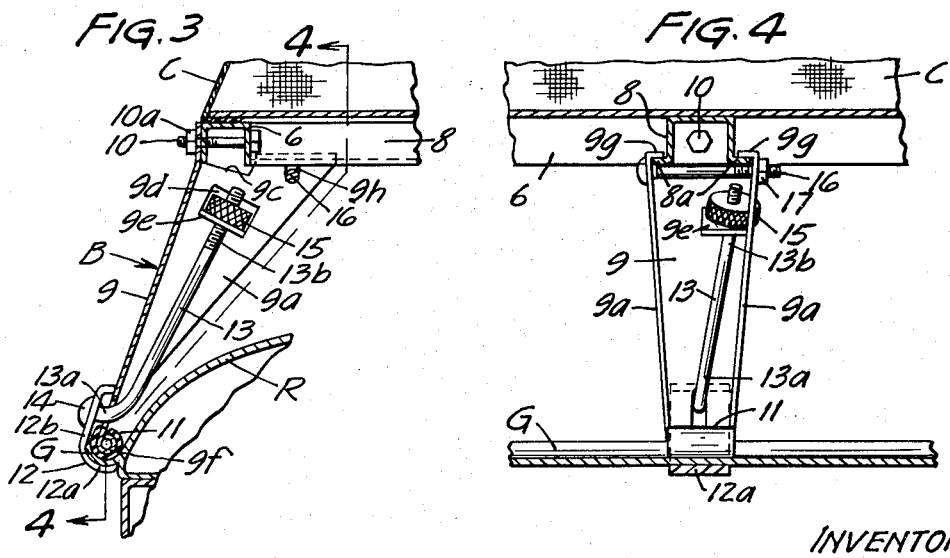
INVENTOR
URBAN C. McMILLER
BY Williamson+Palmatier
ATTORNEYS

United States Patent Office 3,141,588
Patented July 21, 1964

3,141,588
CAR-TOP LUGGAGE CARRIER WITH CLAMPING, SUPPORT BRACKETS
Urban C. McMiller, Minneapolis, Minn., assignor to Karpak Company, Minneapolis, Minn., a corporation of Minnesota
Filed May 29, 1962, Ser. No. 198,585
2 Claims. (Cl. 224—42.1)

This invention relates to luggage carriers adapted to be firmly secured to automobile tops or roofs. Such carriers may be covered with the cover distended by collapsible supporting bows as shown in my United States Patent No. 2,621,836, or may be uncovered if desired with article-supporting means secured above a base platform. In either instance, a frame of generally rectangular configuration is provided.

My present invention is an improvement and simplification in many general respects over the structure shown in my said Patent No. 2,621,836.

In my said patent and other prior art structures of the class described, the base platform is mounted on suction cups or the like which are anchored to longitudinal side portions of the roof. Anchoring or clamping straps were associated therewith to anchor and adjustably tighten the relationship between the base platform and the car roof, said clamping straps usually having hook elements for engaging horizontal flanges provided by the longitudinal sides of the car roof, such as those furnished by the rain gutters, conventional with most automobiles.

It is an object of my present invention to simplify prior art structures of the classes described without sacrifice in the efficiency of attachment and supporting means, through provision of unitary support brackets (dispensing with suction cups and other extraneous top-engaging media) by the substitution in close combinative relation of a combined support bracket and adjustable clamp which in multiple will rigidify and support the base platform of the luggage carrier in spaced relation to the automobile top through interlocking with marginal portions of the frame of the base platform and by adjustable clamping action with the out-turned longitudinal flanges such as the rain gutters disposed at the lower side portions of the conventional car tops.

While my invention is readily adaptable for application to a variety of car and truck tops it has particular application to the smaller or compact cars having relatively short roofs such as the Volkswagen.

A further and more specific object is the provision in car-top, luggage carriers of the type having a generally rectangular, rigid base frame of unitary supporting and rigidifying mechanism for securing such frame is spaced relation to the top of an automobile, such mechanism comprising a plurality of units at least two thereof being interposed between each of the longitudinal or side portions of the frame and the lower portions of the sides of the car-top usually defined by rain gutters. The support units at their upper ends rigidly interlock with the sides of the frame, and at their lower ends adjustably clamp and draw against the rain gutters or the like to anchor and support the entire luggage carrier in operative position.

These and other objects and advantages of my invention will more fully appear from the following description made in connection with the accompanying drawings wherein like reference characters refer to the same or similar parts throughout the several views, and in which:

FIG. 1 is a side elevation showing my invention applied to a covered luggage carrier supported from and anchored to the top of a compact type of automobile such as the "Volkswagen" of German manufacture;

FIG. 2 is a front elevation of the same showing the covering and its bracing collapsed when not in use;

FIG. 3 is a cross section on a larger scale taken on the line 3—3 of FIG. 1; and FIG. 4 is an elevational view, partly in section taken on the line 4—4 of FIG. 3.

Referring now to the form of the invention illustrated in the drawings, a conventional type of compact car such as the Volkswagen is illustrated in its upper body portion, having the usual roof R supported from the conventional posts of the car body and extending from the windshield W to the rear and rear window X, and curved conventionally in cross sectional shape and having at its longitudinal side S, the usual elongated rain gutters G. These rain gutters are shown in detail in cross sectional shape in FIG. 4 of the drawings. The type of automobile illustrated at its top is provided with a shiftable sun roof S which when desired, may be opened for exposing a portion of the car top for ventilation and sun.

The body and luggage support or frame of my carrier may take various forms such as the collapsible covered type shown, which comprises a truncated pyramidal, flexible cover C constructed of canvas or suitable flexible plastics, supported by a pair of metal collapsing frame members or bows F of inverted U-shape which as shown, extend longitudinally of the roof and are hinged to collapse inwardly, one upon the other and when distended for expanding the cover in operative position, have transverse link braces interposed between the upper longitudinal elements thereof, all as generally constructed and shown in my earlier Patent No. 2,621,836.

Whether the luggage carrier proper is covered or consists in a number of supporting brackets, is incidental, but it is necessary to my invention that the luggage support be provided with a generally rectangular or annular, substantially rigid frame which may form a part of and support a horizontal deck D, said frame having longitudinal side members 6 which in the form shown, constitute inverted U-bars and which side members are interconnected at their ends by transverse frame end-channels or members 7, also in the form shown being of inverted U-shape.

The generally rectangular frame of the base platform or deck of my luggage carrier, as shown is further reinforced by intermediate cross bars 8, also of inverted U-shape cross section having as shown out-turned flanges 8a which are disposed on their undersides at substantially the level of the longitudinal frame members 6.

Interlocking and working in close combinative relationship with the frame members 6 and 8 of my luggage carrier proper, and clamping with the rain gutters G, I provide a plurality, such as four or six unitary support and clamping brackets indicated individually as entireties by the letter B. Since said several unitary brackets are identical in construction, the corresponding and identical parts of each shall be similarly numbered as shown in the drawings.

Each bracket comprises essentially a substantially rigid downwardly converging shank of U-shaped cross section having a central or outer longitudinal web 9 and a pair of inturned triangulate side flanges or webs 9a, opposed in planes of parallel relation. The upper extremity of the central web 9 is slightly angled inwardly and extends above the upper edges of the side webs 9a to provide an attachment tongue 9b which is adapted to precisely overlie the outer flange of the elongated, inverted U-shaped frame bar 6, to be attached thereto by suitable means such as the carriage bolt 10 which as shown extends through both vertical flanges of the appropriate frame member 6 and is secured thereto by a conventional nut 10a.

The side flanges 9a of the shank of each bracket are notched at their upper ends as indicated by 9c, the notches of said flanges being horizontally aligned to interfit and interlock with the lower edges of the side flanges of the corresponding frame member 6 which define an inverted channel. The said notches and shoulders defined thereby in combination with the carriage bolt fastening of tongue 10 effect a very rigid interlocking and connection of the upper ends of the respective brackets B with the base frame of the luggage carrier.

The lower extremities of the brackets B from the stock of the central web 9 are rolled or inturned to form rounded feet 9f, which preferably are covered with a compressible material such as reinforced rubber 11 cemented or otherwise secured thereto to form a cushion of approximately the interior cross sectional shape of the rain gutters G.

Clamping hooks 12 are provided for the several brackets B, each of said hooks having a lower hook extremity 12a shaped to snugly embrace the lower and outer contour of the rain gutter or other longitudinal turned flange disposed along the longitudinal lower portions of the roof proper of the automobile. The hooks 12 have upwardly extending shank portions 12b which are apertured to receive the turned lower extremity of a clamping link 13, said extremity being out-turned and terminating in a head 14, which abuts against the outer surface of the hook shank 12b beyond the said apertures.

The shanks of links 13 extend substantially straight from the out-turned lower portions somewhat diagonally inwardly to the horizontal and have threaded upper ends 13b which threadedly engage a heavy knurled adjustment nut 15, said nut being generally circular as shown and having its periphery at one side thereof working through a slot 9d provided in one of the side flanges 9a of the bracket shank 9. The nut 15 is confiend against downward movement by a struck-in flange 9e extending from the adjacent side flange 9a which may be formed in aperturing for the slot 9d. Thus, when the nut 15 is turned upon the threaded end 13b of the link 13 the link will be with screw force, drawn upwardly to not only raise and clamp the hook 12a against the underside of the rain gutter but to also draw the shank 12b of the clamping hook inwardly towards the adjacent contoured side of the roof.

While my bracket units may comprise only the parts previously described for rigidly interlocking the upper ends of the respective brackets with the longitudinal frame members, I prefer where intermediate braces such as the inverted channel bars 8 are employed to construct the upper ends of said brackets to also interlock and rigidly secure with said intermediate members 8. To this end as shown the side webs or flanges 9a of the bracket shanks at the upper extremities thereof, are provided with overlying, inturned flanges 9g which overlie and abut the out-turned flanges 8a of the intermediate, reinforcing cross bars 8. The side flanges 9a as shown are further clamped together and reinforced in each instance by a common carriage bolt 16 which passes through suitable oval slots 9h appropriately formed in the upper and rearward portions of the parallel flanges 9a, said bolt having at its threaded end thereof a nut 17 which effects clamping pressure and secures the flanges 9g of the shank to the underlying out-turned flanges 8a of the intermediate reinforcing bars 8.

Thus, with the additional reinforcing and interlocking and clamping of the upper ends of the respective bracket units B with the intermediate reinforcing bars, a very rugged, permanent and rigid attachment of the bracket shanks to the base platform of the luggage carrier is assured.

The cooperation of the cushioned lower extremities of the bracket shanks with the inside or top portions of the rain gutters in combination with the efficient clamping action of the hooks 12a and connecting links 13 provide rigid and adjustable connection and clamping of the brackets with the rain gutters or other out-turned flanges extending at the longitudinal sides of the automobile top.

It must be remembered that adjustable clamping is obtained externally of the shanks 9 of the brackets by merely manipulating the knurled nuts 15 cooperating with the threaded ends 13b of the links to not only draw the hooks 12a upwardly but through the precise relationship of the out-turned curved extremities of links 13, to also draw said hooks simultaneously inward for effective rigidifying and clamping of the supporting structure.

From the foregoing description it will be seen that I have provided a simplified and economical car-top luggage carrier wherein a base frame is efficiently supported in fixed spaced relation to a car-top by efficient and rigidly secured unitary brackets of novel and functional structure. These unitary brackets take the place of sets of supports such as suction cups and side straps for tensioning of the prior art structures.

My improved support and anchoring structure while generally applicable to automobile tops is particularly suited for economical luggage carriers for attachment to the smaller and compact cars.

It will, of course, be understood that various changes may be made in the form, details, arrangement and proportions of the various parts without departing from the scope of my invention.

The term "generally rectangular" as used in the appended claims and elsewhere in the application is used in the broad sense to include oval or other annular shapes which have longitudinal side portions on the frame and where the general overall configuration is comparable to a rectangle.

What is claimed is:

1. In a car-top luggage carrier having a base frame with longitudinal side members of generally rectangular cross sectional shape,
   clamping support brackets for rigidly securing said base frame to and in spaced relation with a car top and comprising a plurality of unitary structures, at least a pair thereof being rigidly interconnected in widely spaced relation with each of the longitudinal side members of said frame,
   each of said brackets having an upstanding shank of U-shape cross section and including a central section and downwardly converging side or flange sections,
   the upper ends of said side sections being rectangularly notched and interlocked with one of the side members of said base frame,
   said central section having an upper tongue portion attached to one of said side frame members,
   said shank terminating in a foot portion shaped to interfit the upper side of a rain gutter provided by the car-top,
   an upwardly extending link within said shank and having a hook element connected with the lower end thereof for engagement against the lower side of said rain gutter,
   said link having a threaded upper end extending in proximity to the upper portion of said shank,
   and an adjustable clamping element extending through one side of said shank near the upper portion thereof and threadedly engaging said link to produce relative up and down movement upon said hook.

2. The structure set forth in claim 1 further characterized by an opening formed in one side of said shank through which said adjustable clamping element protrudes, and a flange provided by said shank at the lower side of said opening against which said adjustment element abuts.

References Cited in the file of this patent
UNITED STATES PATENTS
3,081,841     Mauro _____ Mar. 19, 1963

FOREIGN PATENTS
96,934     Norway _____ Oct. 17, 1960